June 28, 1938.   W. I. HOLMES   2,122,096
STOP MECHANISM
Filed Dec. 1, 1936
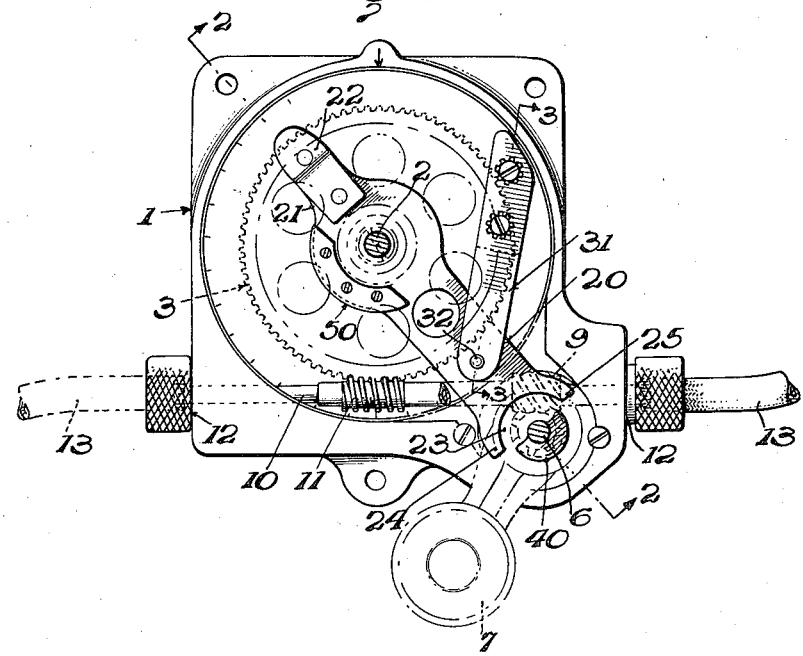
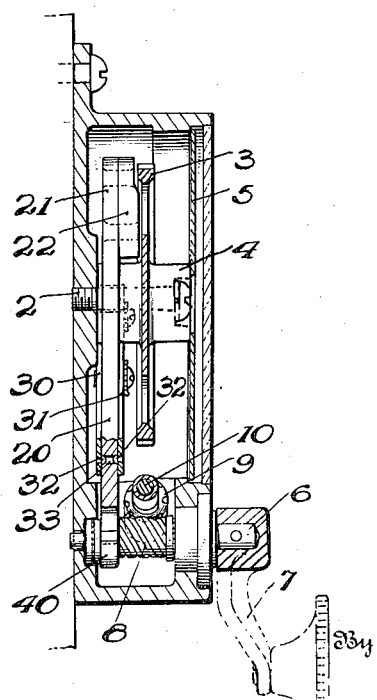
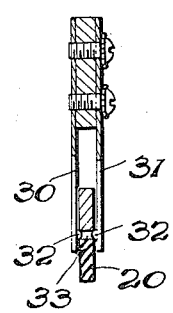
Inventor
William I. Holmes
By Samuel Scrivener Jr.
Attorney Patented June 28, 1938

2,122,096

UNITED STATES PATENT OFFICE 2,122,096

STOP MECHANISM

William I. Holmes, Hyattsville, Md., assignor to Washington Institute of Technology, Inc., Washington, D. C., a corporation of Delaware Application December 1, 1936, Serial No. 113,685

9 Claims. (Cl. 192—138)

This invention relates to stop mechanisms and is particularly intended to provide novel means for positively stopping the rotation of a dial, shaft or other rotating part.

While the invention is not limited to use with any particular type of apparatus and may be employed as a means for stopping any rotating element, it will be particularly described herein with relation to a remote control system. In the operation of such a system, the setting of the remote mechanism is usually effected through flexible cables which are caused to rotate by some manual or other means at the control point. Further, the degree of setting is usually indicated at the control station by the rotation of a dial or pointer mechanism which is actuated, through reduction gearing, by the manual operating means. It is a particular object of this invention to provide a means for stopping the rotation of the indicating means and of the flexible cables, which stop means will be so operated that no strain will be placed on the flexible cables or reduction gearing by any force exerted on the operating means after the pre-determined limit of movement has been reached.

It is also an object of this invention to provide, in a system in which an operating means causes the rotation, through gearing, of a number of separate elements, a stop mechanism which operates only on the operating means and, by stopping the rotation of such operating means at any pre-determined point, effectively prevents further rotation of any of the separate operated elements.

A further object of the invention is to provide a positive stop mechanism which will so operate that the strain of the stopping action will not be transmitted as a torsional stress through any of the rotating parts of the assembly to which the stop mechanism is applied, but will be absorbed as a direct thrust on one of the members of the assembly or on a member particularly provided to absorb such stress.

A further object of the invention is to provide a stop mechanism for a rotating assembly which may be so set as to cause the rotary movement of the assembly to be stopped at any point or points in the rotary travel of the assembly as may be desired, which point or points may be changed as desired.

A further object of the invention is to provide a stop mechanism having a novel construction and arrangement of parts and which will be so constructed and arranged that it may be easily and cheaply manufactured and may be easily applied to any rotating assembly.

Other objects and features of novelty will be apparent from the following description and the annexed drawing, it being expressly understood however that such description and drawings are merely descriptive of the invention, which is not limited in any way thereby, or otherwise than by the appended claims.

Referring to the drawing in which similar reference numerals refer to like parts, Fig. 1 is a view, partly broken away, showing a stop mechanism according to the present invention and applied to a remote control mechanism;

Fig. 2 is a view taken on the line 2—2 of Fig. 1, and

Fig. 3 is a view taken on the line 3—3 of Fig. 1.

There is provided by the present invention a stop mechanism which may be generally employed to stop rotating parts when a pre-determined limit of movement of such parts has been reached. While the invention is of general utility as a stop mechanism, it will be described particularly in connection with a remote control mechanism to which it may be applied. Such a device is illustrated in the drawing and, referring thereto, it will be seen that the remote control mechanism comprises a casing 1 within which there is journaled a shaft 2 which is preferably fixed to the casing and on which is rotatably mounted a gear wheel 3 which is provided with a hub portion 4 which extends toward the front of the casing and on the exterior portion of which there is mounted a dial 5 which may be marked off into any desired number of divisions, such as from 0 to 180, as shown.

Means are provided for rotating the gear wheel 3 and dial 5 and such means comprise a second shaft 6 which is spaced from shaft 2 and which carries on its outer extremity and exteriorly of the casing 1 a handle or crank 7 which is adapted for manual operation to effect rotation of shaft 6. Disposed within the casing and surrounding and keyed to shaft 6 there is provided a spiral gear 8 which meshes with a second spiral gear 9 which is carried by and keyed to a shaft 10 which preferably extends entirely across the lateral extent of the casing 1. The shaft 10 is provided preferably midway between its ends with a worm gear 11 which meshes with the gear wheel 3 which is rotatably carried by shaft 2. The ends of shaft 10 are received in journals 12 in the opposite sides of casing 1 and the ends of the shaft may be connected to one or more flexible shafts 13 which may be connected at remote points to tuning means or other apparatus to be operated.

It will be apparent that when crank 7 is operated to rotate shaft 6, the spiral gear 8 will be rotated and, due to its mesh with spiral gear 9, will cause gear 9, shaft 10 and worm gear 11 to rotate. Gear wheel 3 will be rotated by worm 11, thereby causing rotation of the dial 5. The rotation of shaft 10, in the manner described, will cause the rotation of flexible shafts 13 to thereby effect any desired operation at a remote point.

It will be apparent that the rotation of the dial 5 and the flexible shafts 13 may be stopped at any desired point, if desired, by causing one of the rotating members, such as dial 5 or gear 3, to strike against a fixed abutment. Such a method of stopping the rotation of the moving parts is subject to the disadvantage that the stop position cannot be readily adjusted, and the further and principal disadvantage that if the dial 5 or gear 3 is stopped by engagement thereof with a fixed abutment, any rotational force exerted on handle 7 after the stopping will subject the shafts and gearing to strains which, due to the reduction gearing, may reach considerable proportions and cause deformation or twisting of parts of the assembly. Further, such strains transmitted through the gearing will cause undesired rotary movement of the flexible shafting 13, resulting in an inaccurate operation or setting at the remote station.

Means are provided by the invention for positively stopping, at any desired point, the rotation of the parts described hereinbefore, and which positive stop means will be so operative as to prevent the transmission of any forces, which may be exerted on the handle 7 after the operation of the stop means, through the shafting or gearing operated by the handle, or to the flexible shafting. Such means are illustrated in the drawing and, referring thereto, it will be seen that they comprise a stop member 20 which consists of a relatively elongated flat member, one end of which is arranged adjacent the shaft 6 while adjacent the other end of which there is provided an opening through which the shaft 2 extends. It will be noted that while the member 20 abuts and bears on the shaft 2, there is no connection between these members and the stop member is not adapted to rotate with the shaft. The end of the stop member 20 extends beyond the shaft 2 and terminates in a reduced portion 21 which extends longitudinally of the stop member and which is provided on either the front or rear face thereof with an abutment 22 which may consist merely of a piece of metal or other material attached to the face of the reduced portion 21. The end of the stop member 20 which is disposed adjacent the shaft 6, and which may be referred to as the lower end, is provided with an opening 23 therein, the edges of which define, with the longitudinal edges of the stop member, two depending legs 24, 25 which are disposed at opposite sides of the lower end of the stop member and which terminate at their lower ends in faces which are of small relative width with respect to the total width of the end of the stop member.

The stop member 20 is adapted to be so disposed that the legs 24, 25 thereof are disposed equidistantly on opposite sides of the shaft 6, and the ends of such legs are adapted to lie approximately along a line extending through the center of the shaft. The stop member is resiliently maintained in this position by two spring devices 30, 31 which are disposed adjacent opposite faces of the stop member and bear on the stop member and which carry at their ends balls or struck-out portions 32 which are received in the opposite ends of an opening 33 in the stop member. It will be apparent that the spring devices 30, 31, which are preferably formed of phosphor bronze, will operate to maintain the control member in central position, but that the control member may be moved from such position by displacing the ball members 32 from the ends of the opening 33.

Mounted on the shaft 6 and keyed thereto in any suitable manner, is an abutment member 40 which is preferably of semi-circular shape, to thereby provide two aligned faces which preferably extend radially from the shaft 6 and which, in the position shown in Fig. 1, are substantially aligned with the lower end edges of the legs 24, 25 of the stop member 20. The abutment member 40 is of such dimensions and is so arranged on shaft 6 that, when the shaft is rotated, the abutment member will rotate freely within the opening 23 in the end of the stop member 20. However, if the stop member 20 is shifted about its bearing on shaft 2, either one or the other of the lower end edges of the legs 24, 25 will abut one of the faces of the abutment member 40 and thereby prevent further rotation of the abutment member or of shaft 6.

Means are provided for shifting the stop member 20 about its bearing on shaft 2 at any predetermined point in the rotation of the rotary assembly and such means comprise the abutment member 50 which is preferably mounted on the gear wheel 3 for rotation therewith. This abutment member is preferably arcuate in shape and is provided with end edge portions or faces. The member 50 is so disposed and proportioned that it is in the plane of the abutment 22 which is formed on the reduced end 21 of the stop member. The member 50 may be adjustably attached to the gear wheel 3 in such a manner that the position of the end edges thereof with respect to abutment 22 may be varied, but it will be apparent that, at some time in the rotation of member 50 with gear wheel 3 one or the other of the end edges thereof will come in contact with abutment 22 and thereafter further rotation of shaft 2 and abutment member 50 will cause the stop member to move about shaft 2. Such movement of the stop member will cause the lower end thereof to move in such a way that either one or the other of legs 24, 25 will move toward shaft 6.

In the operation of the stop mechanism described, the abutment member 50 may be set to any desired position which will cause one or both of the end edges thereof to come into contact with abutment 22 at desired points in the travel of the dial 5. The rotation of crank 7 to cause rotation of dial 5 and flexible shafts 13 in the manner described hereinbefore will cause stop member 40 to rotate freely within the opening 23 in the stop member. Due to the interposition of the reduction gearing, shaft 6 and abutment member 40 will travel through a large number of revolutions to effect a small movement of dial 5. The rotation of the various parts of the assembly will be unobstructed until the dial reaches a pre-determined point, when the abutment member 50, which is rotating with gear wheel 3 and dial 5, reaches such a point that one or the other of the end faces thereof abuts one of the sides of the abutment 22. When this occurs, any further increment of movement of the rotating parts in the same direction will cause stop member 20 to move about shaft 2 in such a manner that the lower edge of one of the legs 24, 25 will move into engagement with the corresponding one of the edges of the abutment member 40, thereby preventing further rotation in the one direction of abutment member 40, gear 8, shaft 6 or crank 7, and thereby effectively preventing further rotation of other parts of the assembly. At the same time, the opening 33 in the stop member 20 will move out of engagement with the balls on spring devices 30, 31.

If the handle 7 is now rotated in the opposite direction, the rotation of stop member 40 will be un-obstructed and the parts of the assembly will be freely rotated, until the second of the end edges of the abutment member 50 comes into contact with abutment 22 and causes an operation similar to that described hereinbefore to prevent further rotation in a direction opposite to that previously set forth. It will be seen that when the direction of rotation is reversed after a stopping operation, the rotation of the abutment member 40 will cause the arcuate face thereof to come into contact with the inner arcuate face of the opening 23 in the end of the stop member, to thereby return the stop member to centered position in which the ball members 32 engage the opening 33 in the stop member.

It will be seen that the operation of the stop means according to the invention will be positive and will effectively prevent any further rotation of the parts of the assembly by the handle 7, although the stop mechanism does not in any way engage any of the driven elements of the rotary assembly. Accordingly, after the stop mechanism is actuated, any further force exerted on the handle 7 will be exerted against the stop member 20 and the member which supports it and will not be transmitted through the gearing or shafting or exerted as a torsional force thereon. In this manner, therefore, all danger of twisting the shafting or stripping or deforming the gears of the assembly is obviated. Further, inasmuch as the handle 7, shaft 6 and spiral gear 8, cannot be rotated after operation of the stop mechanism, there can be no additional or accidental rotation of the flexible shafting 13 and the desired setting at the remote station will therefore be maintained.

It will be apparent to those skilled in the art that many of the parts or elements disclosed and described herein are only illustrative of the invention. For example, any desired type or arrangement of gearing may be employed, or a pointer may be employed in place of the dial or, if desired, no pointer or dial whatsoever may be employed. Further, instead of bearing on the shaft 2, the stop member 20 may be pivoted on some other element of the assembly or to some outside member. All of these changes, as well as many others, may be made in the disclosed device, and further improvements and modifications may be made therein without departing in any way from the spirit or scope of the invention, for the limits of which reference must be had to the appended claims.

What is claimed is:

1. A stop mechanism for an assembly comprising a driving member, a driven member, and gearing connecting said driving member to said driven member, said stop mechanism comprising an abutment carried by said driving member, a pivoted stop member disposed adjacent said driving member and normally disengaged from said abutment, and means carried by said driven member and operable upon rotation of said driven member through a pre-determined angle in either direction to move said stop member in one or the other direction about its pivot into engagement with said abutment to thereby prevent further rotation of said driving member in one direction.

2. A stop mechanism for an assembly comprising a driving member, a driven member, and gearing connecting said driving member to said driven member, said stop mechanism comprising an abutment carried by said driving member, a stop member having separate portions which are disposed adjacent said abutment and normally disengaged therefrom, and means operable upon rotation of said driven member through a pre-determined arc in either direction for moving one or the other of the separate portions of said stop member into engagement with said abutment to thereby prevent further rotation of said driving member in one direction.

3. A stop mechanism for an assembly comprising a driving member, a driven member, and gearing connecting said driving member to said driven member, said stop mechanism comprising an abutment carried by said driving member, a single stop member having spaced portions which are disposed adjacent said abutment and normally disengaged therefrom, and means carried by said driven member and operable upon rotation of said driven member through a predetermined arc in either direction to move one or the other of the spaced portions of said stop member into engagement with said abutment to thereby prevent further rotation of said driving member in one direction.

4. A stop mechanism for an assembly comprising a driving member, a driven member, and gearing connecting said driving member to said driven member, said stop mechanism comprising an abutment carried by said driving member, a pivoted stop member having portions arranged adjacent said abutment and normally disengaged therefrom, a single abutment member carried by said driven member and adapted to engage said pivoted stop member after rotation of said driven member through a pre-determined angle in either direction to move one or the other of said portions of said stop member into engagement with said abutment on said driving member to thereby prevent further rotation of said driving member in one direction.

5. A stop mechanism for an assembly comprising a driving member, a driven member, and gearing connecting said driving and driven members, said stop mechanism comprising an abutment carried by said driving member, a unitary stop member having one end thereof arranged adjacent said abutment and having an aperture in said end within which said abutment normally rotates when said driving member is rotated, and means operable upon rotation of said driven member through a pre-determined arc for moving said stop member to such a position that said end of said stop member is moved into the path of said abutment, to thereby prevent further rotation of said driving member in one direction.

6. A stop mechanism for an assembly comprising a driving member, a driven member, and gearing connecting said driving and driven members, said stop mechanism comprising an abutment carried by said driving member, a unitary stop member having depending legs at one end thereof which are spaced apart to provide an aperture therebetween within which said abutment rotates when said driving member is rotated, and means operable upon rotation of said driven member through a pre-determined arc for moving either one or the other of said legs into engagement with said abutment to thereby prevent further rotation of said driving member in one direction.

7. A stop mechanism for an assembly comprising a driving member, a driven member, and gearing connecting the driving and driven members, said stop mechanism comprising an abutment carried by said driving member, an abutment carried by said driven member, a pivoted stop member, one end of said stop member being provided with spaced leg portions which are arranged adjacent to but disengaged from said abutment carried by said driving member and which define therebetween an aperture within which said abutment rotates when said driving member is rotated, the other end of said stop member being provided with a portion disposed in the path of travel of the abutment carried by said driven member and adapted to be abutted by said abutment when said driven member has moved through a pre-determined arc, to thereby move one or the other of said leg portions into engagement with the abutment carried by said driving member, to thereby prevent further rotation of said driving member in one direction.

8. A stop mechanism for an assembly comprising a driving member, a driven member, and gearing connecting said driving member to said driven member, said stop mechanism comprising two radially extending abutments carried by said driving member, two abutments carried by said driven member, a stop member, one end of said stop member being provided with spaced depending leg portions one arranged adjacent each of the abutments carried by said driving member, said leg portions having an aperture therebetween within which said abutments are adapted to freely rotate when said driving member is rotated, the other end of said stop member having a member thereon arranged within the path of travel of the abutments carried by said driven member and adapted to be engaged by one or the other of said abutments upon rotation of said driven member in one or the other direction through a pre-determined arc, to thereby cause said stop member to be so moved as to cause one or the other of said leg portions to be moved into engagement with one or the other of the abutments carried by said driving member to thereby prevent further rotation of said driving member.

9. A stop mechanism for an assembly comprising a driving member, a driven member, and gearing connecting said driving member to said driven member, said stop mechanism comprising a unitary device having stop members normally disposed adjacent but not engaged with said driving member, either of said stop members being movable into position to engage said driving member and prevent further rotation thereof in one direction, and means operable by rotation of said driven member for moving one or the other of said stop members into position to prevent further rotation in one direction of said driving member.

WILLIAM I. HOLMES.